United States Patent [19]

Ellett

[11] Patent Number: 4,487,643

[45] Date of Patent: Dec. 11, 1984

[54] METHOD AND APPARATUS FOR REMOVING PROTECTIVE COATING FROM PIPE SECTION

[76] Inventor: William A. Ellett, 1607 Fairview Ave., Monroe, La. 71201

[21] Appl. No.: 565,211

[22] Filed: Dec. 23, 1983

[51] Int. Cl.³ .............................................. B32B 31/24

[52] U.S. Cl. .......................................... 156/80; 62/64; 83/15; 83/170; 156/155; 156/344; 156/498; 225/1; 225/93.5; 264/28; 427/398.3

[58] Field of Search ................. 62/62, 64; 83/15, 170; 156/80, 155, 344, 498; 225/1, 93.5; 264/28; 427/398.1, 398.3, 398.4

[56] References Cited

U.S. PATENT DOCUMENTS 2,956,717 10/1960 Scharf .................................... 225/1
3,623,337 11/1971 Tremont .............................. 62/293
3,744,262 7/1973 Bose ....................................... 62/62
3,878,978 4/1975 Martinek ................................ 225/1
3,936,922 2/1976 Blackstone et al. ........... 225/93.5 X
4,112,795 9/1978 de Putter ............................... 83/15
4,220,012 9/1980 Brister .................................. 62/130
4,255,216 3/1981 Conant et al. ........................ 156/80
4,267,699 5/1981 Bahrenburg ............................ 62/66
4,338,970 7/1982 Krackeler et al. ............. 156/155 X
4,370,862 2/1983 Brister .................................... 62/66

*Primary Examiner*—Robert Dawson
*Attorney, Agent, or Firm*—Holman & Stern

[57] ABSTRACT

Access to a pipe section which is surrounded by a protective coating is achieved by enclosing the pipe section in a sleeve and then flowing a refrigerant fluid through the sleeve to render the protective coating brittle. The brittle coating can then be easily broken by means of an impacting hammer, or the like, to provide access to the pipe section.

19 Claims, 3 Drawing Figures

METHOD AND APPARATUS FOR REMOVING PROTECTIVE COATING FROM PIPE SECTION

BACKGROUND OF THE INVENTION

1. Technical Field

The present invention relates to a method and apparatus for removing a protective coating on a pipe section in order to provide access to that pipe section for purpose of repair and maintenance.

2. Discussion of the Prior Art

In maintaining and repairing pipelines, it is often necessary to remove the protective coating which circumscribes a section of the pipe. In order to effect removal of the coating, the coating must be cold enough to be brittle so that it breaks when struck by a hammer, or the like. During the summer months, or in regions where the weather is warm all of the time, cooling of this coating (or "dope" as it is often called) becomes a problem. When the coating becomes hot, it becomes gummy and extremely difficult to remove. The prior art technique for removing this coating is to haul ice and water to the field site where two or three men wash the coating with ice water, using their hands, to obtain the cooling effect. This procedure acquires on the order of one half hour, many gallons of water and ice, and valuable labor time.

OBJECTS AND SUMMARY OF THE INVENTION

It is therefore an object of the present invention to provide a method and apparatus which permits the protective coating on a pipe section to be rendered brittle in a far more efficient and effective manner than is possible in the prior art.

In accordance with the present invention, a sleeve is wrapped about the coated pipe section and closed along its length with a zipper, or the like. The ends of the sleeve are secured tightly about the pipe section by means of straps or similar fasteners. The sleeve is provided, at one end, with at least one inlet for receiving refrigerant fluid, such as carbon dioxide ($CO_2$). One or more exhaust ports are provided proximate the other end of the sleeve so that a generally longitudinal flow path is provided between the sleeve and the protective coating which surrounds the pipe section. The flow of refrigerant through the sleeve causes the coating to become sufficiently brittle in approximately two minutes, after which the sleeve can be removed and the brittle coating easily broken by striking it with a hammer, or the like. The procedure can be performed by one individual requiring less than five minutes for the complete operation.

These and other objects, features and many of the attendant advantages of the invention will be better understood from the following detailed description when considered in connection with the accompanying drawings wherein like parts in each of the several figures are indentified by the same reference numerals, and wherein;

FIG. 1 is a view in plan of a coated type section, partially broken away to show both the coating and the pipe;

FIG. 2 is a view in plan showing the apparatus of the present invention employed on the coated pipe of FIG. 1 and diagrammatically illustrating connections to the apparatus which permit employment of the method of the present invention; and FIG. 3 is a view similar to FIG. 2 showing the pipe of FIG. 1, after treatment in accordance with the present invention and after the brittle coating on the pipe has been impacted and broken.

DESCRIPTION OF THE PREFERRED EMBODIMENTS

Figure 1:
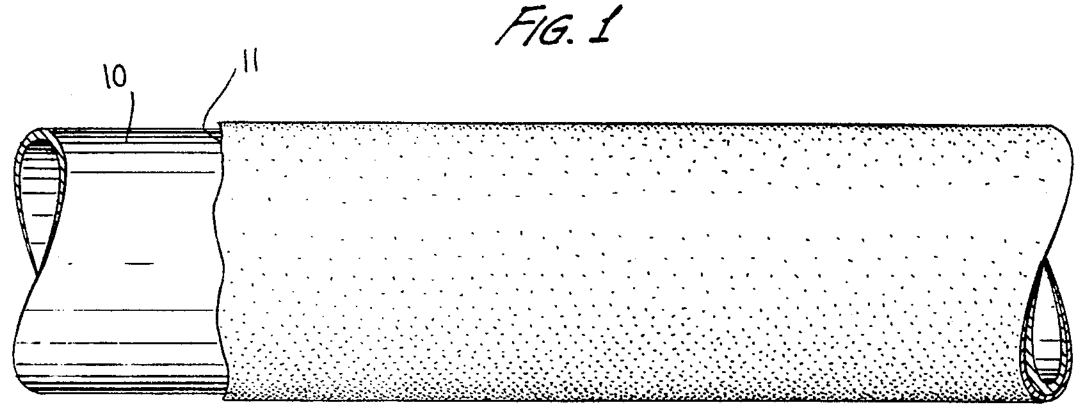

Referring specifically to FIG. 1 of the accompanying drawings, a section of pipe 10 is provided with a protective coating 11. Pipe 10 is typically part of a pipeline and is provided with a protective coating 11 to protect against the elements and to provide sealing at joints between sections of pipe. As noted above, it is sometimes necessary for the protective coating 11 to be removed. In order to do this, the coating must be cooled sufficiently to render the coating brittle. Thereafter, the brittle coating may be broken off the pipe 10 by impacting the coating with a hammer, or the like. In order to sufficiently cool the coating 11 in accordance with the present invention, a sleeve 12 is placed about the section of pipe of interest. Sleeve 12 is made from one or more sheets 13 of a lightweight material that is non-porous to the refrigerant fluid employed in the manner described below. One example of material for sheet 13 is the material sold under the name Hypalon by the E I DuPont De Nemours company. Other materials can also be employed consistent with the purposes of the present invention as described hereinbelow. The longitudinally-extending end of sheet 13 are joined by a zipper 14 to form the sleeve 12 from sheet 13. Each transversely-extending end of sheet 13 is provided with a closure strap 15 which is capable of being tightly secured about the circumference of pipe 10 and its coating 11. In the preferred embodiment, straps 15 are Velcro draw straps.

Sheet 13 is provided with a pair of transversely-spaced snap-on female connectors 16 which extend through the sheet 13 to provide flow communication between the exterior and interior of sleeve 12. Although two connectors 16 are illustrated, the invention, in some embodiments, will function properly if only one such connector is provided or if a number of connectors in excess of two is provided. Connector 16 are disposed proximate one end of the sleeve 12 and are longitudinally spaced from a plurality of exhaust ports 17 disposed proximate the opposite end of the sleeve. Exhaust ports 17 are transversely spaced from one another and, in the illustrated embodiment, four such exhaust ports are provided.

Figure 2:
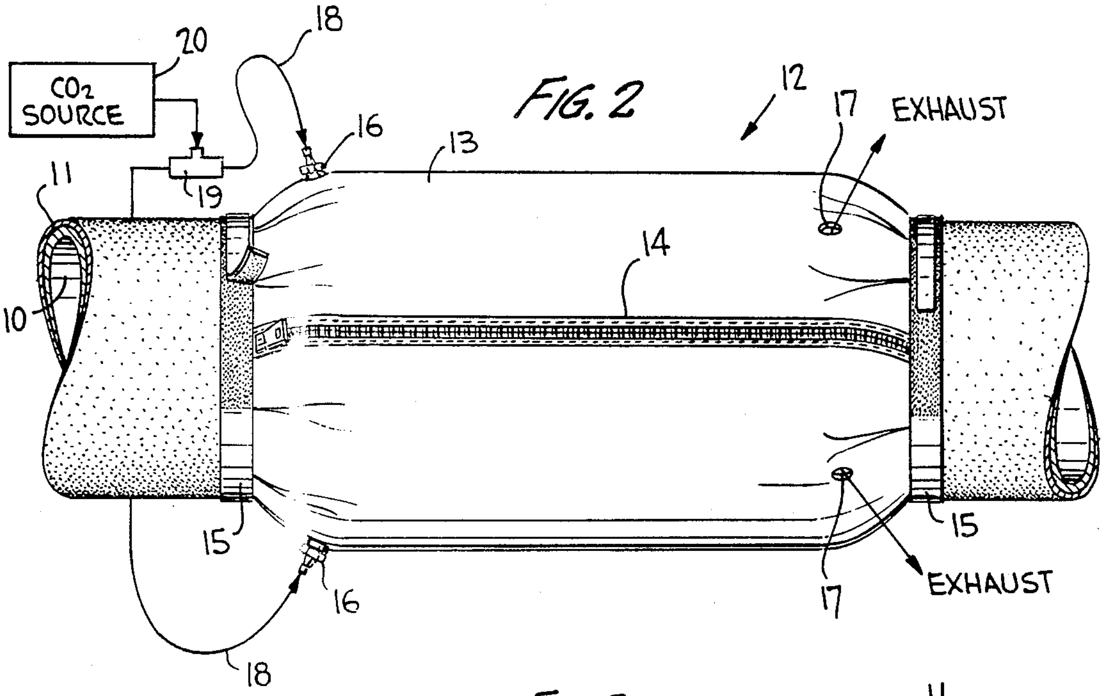

The circumference of sleeve 12 is greater than the circumference of the coated pipe 10 so that an annular space exists between the sleeve and pipe. Fluid received under pressure at connectors 16 flows longitudinally through this annular space and exhaust through exhaust port 17. Connectors 16 are adapted to receive suitable male valve connectors, illustrated diagrammatically in FIG. 2, which receive pressurized fluid via respective hoses 18. The hoses connect to a T-connector 19 which, in turn receives refrigerant fluid from source 20. In the illustrated embodiment the refrigerant fluid is carbon dioxide, although other refrigernat fluids may be employed.

Figure 3:
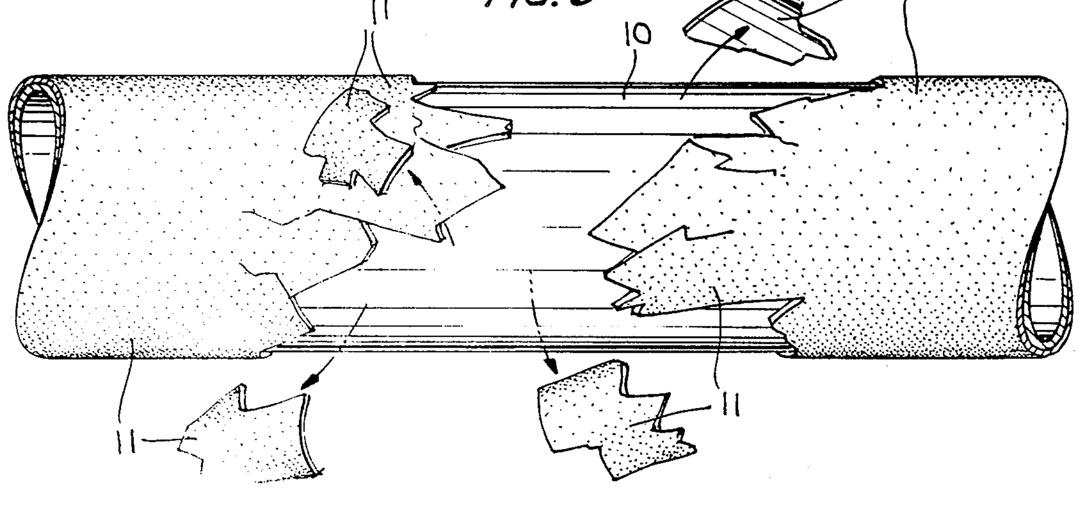

In accordance with the present invention, sleeve 12 is placed around the desired pipe section and zipper 14 is closed. The end straps 15 are tightly secured around the pipe periphery so as to seal the annular space between the sleeve and the pipe. The male connectors on hoses 18 are then connected to the female connectors 16 at sleeve 12. The refrigerant fluid is then permitted to pass through the hoses and into the sleeve interior where it flows longitudinally along the pipe in contact with the coating 11. The refrigerant fluid is exhausted to ambient through exhaust ports 17. The low temperature refrigerant fluid which flows along the coating 11 causes that coating to become very brittle within a few minutes. At this time the sleeve 12 is removed from the pipe by opening straps 15 and zipper 14. Coating 11 may then be struck with a hammer or similar instrument, so that the coating breaks into pieces and falls off the pipe 10 in the manner illustrated in FIG. 3.

It is seen from the foregoing description that the present invention employs a sealed jacket or sleeve of extremely lightweight material positioned about a section of pipe having a protective coating thereon. Carbon dioxide or other suitable refrigerant fluid is passed through the sleeve and along the coating to effect rapid temperature reduction of the coating. The cold coating becomes extremely brittle and breaks readily when struck by a hammer or other hard object.

As noted above, the preferred material for the present invention is Hypalon which is lightweight, flexible and easily transported. Such material also withstands low temperatures and is reuseable for unlimited applications. Other materials, such as nylon or nylon-like materials, may also be employed.

From the foregoing description, it will be appreciated that the invention makes available a novel method and apparatus for providing access to a section of pipe through a coating which surrounds the pipe. The method and apparatus are easy to employ and requires considerably less time than prior art techniques.

Having described a preferred embodiment of a new and improved method and apparatus for effecting access to a pipe section through a coating disposed about that pipe section in accordance with the present invention, it is believed that other modifications, variations and changes will be suggested to those skilled in the art in view of the description set forth above. It is therefore to be understood that all such variations, modifications and changes are believed to fall within the scope of the present invention as defined in the following claims.

I claim:

1. A method of providing access to a section of pipe disposed beneath a protective coating, said method comprising the steps of:

enclosing said pipe section in a sleeve member;
flowing a refrigerant fluid through said sleeve member in contact with said protective coating to lower the temperature of the protective coating sufficiently to render it brittle;
removing said sleeve member from said pipe section;
breaking the brittle protective coating by striking the coating.

2. The method of according to claim 1 wherein the step of enclosing includes the steps of:

wrapping a flexible material about said pipe section;
securing longitudinally-extending ends of said flexible material together with a zipper extending longitudinally of said pipe section to form said sleeve member;
drawing each circumferentially-extending end of said sleeve member tightly against said pipe section.

3. The method according to claim 2 wherein the step of drawing includes the step of circumferentially contracting end straps, disposed at respective ends of said sleeve member, tightly against said pipe section.

4. The method according to claim 1 wherein the step of flowing includes the steps of:

connecting a source of refrigerant fluid from outside said sleeve member to the interior of said sleeve member;
pressurizing the refrigerant fluids; and
exhausting the refrigerant fluid from inside the sleeve member to provide a continuous refrigerant fluid flow from said source through said sleeve member.

5. The method according to claim 4 wherein the step of connecting includes the step of inserting a first between said source of refrigerant fluid and a snap-on connector on said source member.

6. The method according to claim 4 wherein the step of connecting includes the step of inserting first and second hoses from respective snap-on connectors on said sleeve member to said source of refrigerant fluid via a T-connector.

7. The method according to claim 1 wherein said step of breaking includes impacting said brittle protective coating with a hammer.

8. A method of providing access to a pipe section disposed within a protective coating, said method comprising the steps of:

enclosing said pipe section in an enclosure member;
cooling the enclosed pipe section exterior of the pipe section and within the enclosure member sufficiently to render the protective coating brittle;
breaking the brittle protective coating to expose the pipe section.

9. The method according to claim 8 wherein the step of enclosing includes the steps of:

wrapping a flexible material about said pipe section;
securing longitudinally-extending ends of said flexible material together with a zipper extending longitudinally of said pipe section to form a sleeve member; and
drawing each circumferentially-extending end of said sleeve member tightly against said pipe section.

10. The method according to claim 9 wherein the step of drawing includes the step of circumferentially contracting end straps, disposed at respective ends of said sleeve member, tightly against said pipe section.

11. The method according to claim 9 wherein the step of cooling includes the steps of:

connecting a source of refrigerant fluid from outside said sleeve member to the interior of said sleeve member;
pressurizing the refrigerant fluid; and
exhausting the refrigerant fluid from inside said sleeve member to provide continuous refrigerant fluid flow from said source through said sleeve member.

12. The method according to claim 11 wherein the step of connecting includes the step of inserting a hose between said source of refrigerant fluid and a snap-on connection on said sleeve member.

13. The method according to claim 1 wherein said refrigerant fluid is carbon dioxide.

14. Apparatus for use in conjunction with a refrigerant fluid for cooling and rendering brittle a protective coating deposited about a section pipe, said apparatus comprising:

a sheet of material which is non-porous to said refrigerant fluid, said sheet having first and second longitudinally-extending ends and third and fourth transversely-extending ends, said third and fourth ends being longer than the circumference of said pipe section;

zipper means for selectively engaging said first and second ends to form a sleeve from said sheet;

first and second strap closure means disposed at said third and fourth ends, respectively, for selectively tightly securing said third and fourth ends about the circumference of said pipe section;

first connection means adapted to receive a mating connector means to provide flow communication through said material;

exhaust port means for providing flow communication through said sleeve.

15. The apparatus according to claim 14 further comprising second connection means adapted to receive a further mating connector means to provide flow communication through said material.

16. The apparatus according to claim 15 further comprising:

a T-connector having an inlet and first and second outlet connections; and first and second hoses, each adapted to connect between a respective outlet connection of said T-connection and said first and second connector means, respectively;

wherein said inlet connection of said T-connector is adapted to be connected to a source of said refrigerant fluid.

17. The apparatus according to claim 14 wherein said first connection means and said exhaust port means are longitudinally spaced such that said first connection is disposed proximate said third end, and said exhaust port means is disposed proximated said fourth end.

18. The apparatus according to claim 17 wherein said exhaust port means comprises a plurality of individual exhaust ports defined through said sheet and spaced transversely along said sheet.

19. The apparatus according to claim 14 wherein said first and second strap closure means are first and second draw straps made of Velcro material.

* * * * *